(12) United States Patent
Graham et al.

(10) Patent No.: US 6,712,379 B2
(45) Date of Patent: Mar. 30, 2004

(54) LIFTING AND TOWING DEVICE AND METHOD OF USING SAME

(76) Inventors: Dennis L. Graham, 53509 E. Bison, Strasburg, CO (US) 80136-9321; Edward Lucero, 4817 Stuart St., Denver, CO (US) 80212

( * ) Notice: Subject to any disclaimer, the term of this patent is extended or adjusted under 35 U.S.C. 154(b) by 0 days.

(21) Appl. No.: 09/907,469

(22) Filed: Jul. 17, 2001

(65) Prior Publication Data

US 2002/0125681 A1 Sep. 12, 2002

Related U.S. Application Data

(60) Provisional application No. 60/274,867, filed on Mar. 9, 2001.

(51) Int. Cl.$^7$ .................................................. B60D 1/04
(52) U.S. Cl. ........................ 280/480; 24/129 R; 211/18; 248/304
(58) Field of Search ................... 280/480, 504, 280/514, 402; 114/230.2, 230.26, 230.3, 218, 219; 24/131 C, 131 R, 129 R, 129 C, 369, 373, 698.1; 211/17, 18; D12/162; 248/339, 307, 304; 294/26, 902, 904, 82.13, 82.11; 174/158 F, 171, 175

(56) References Cited

U.S. PATENT DOCUMENTS

| | | | | |
|---|---|---|---|---|
| 86,119 A | * | 1/1869 | Allport | |
| 595,458 A | * | 6/1897 | Bailey | |
| 735,445 A | * | 8/1903 | Banks | |
| 1,585,840 A | * | 5/1926 | Fahnestock | |
| 1,649,655 A | * | 11/1927 | Benson | |
| 2,154,610 A | * | 4/1939 | Fleury | 24/129 W |
| 2,658,247 A | * | 11/1953 | Heuer | |
| 3,055,333 A | * | 9/1962 | Ryan | 114/210 |
| 3,749,820 A | * | 7/1973 | Langlie et al. | 24/129 R |
| 3,865,423 A | * | 2/1975 | Ross | |
| D240,351 S | * | 6/1976 | Generalis et al. | D8/99 |
| 4,097,015 A | * | 6/1978 | Frishman | |
| 4,373,463 A | * | 2/1983 | Beaudette | 114/218 |
| 4,771,137 A | * | 9/1988 | Thompson | 174/172 |
| 5,054,806 A | | 10/1991 | Chester | 280/495 |
| D341,117 S | | 11/1993 | Sundstedt | D12/162 |
| 5,447,241 A | * | 9/1995 | Bureau | 211/18 |
| D368,246 S | | 3/1996 | Hinnant et al. | D12/162 |
| 5,951,416 A | * | 9/1999 | Allen et al. | 473/489 |

* cited by examiner

*Primary Examiner*—Anne Marie Boehler
(74) *Attorney, Agent, or Firm*—Sheridan Ross P.C.

(57) ABSTRACT

A device and method for lifting and towing has at least three prongs, with two prongs curved in an opposite direction from the other prong. A cable, rope or chain is able to be interlaced between the opposed curved prongs, thus retaining the cable, rope or chain in engagement, even if tension is released during a pulling or lifting operation.

2 Claims, 17 Drawing Sheets

LIFTING AND TOWING DEVICE AND METHOD OF USING SAME

RELATED APPLICATION

This application claims priority from U.S. Provisional Patent Application No. 60/274,867 filed on Mar. 9, 2001. The entire disclosure of the provisional application is considered to be part of the disclosure of the accompanying application and is hereby incorporated by reference.

FIELD OF THE INVENTION

The present invention is directed to a lifting and towing device and a method for using such lifting and towing device, and in particular, is directed to a tow hook designed for quick and secure attachment of a chain, tow rope, etc., for example, for pulling a vehicle or for suspending cargo therefrom.

BACKGROUND OF THE INVENTION

Various designs for tow hooks, especially as used with respect to vehicle towing devices, are known. Examples include that disclosed in U.S. Pat. No. 5,054,806 entitled "Dual Function Vehicle Tow Hook", U.S. Pat. No. D341,117 entitled "Rear Tow Hook For An Automobile", and D368,246 entitled "Add-On Vehicle Tow Hook." While all of these prior art hook devices enable a user to contact a rope, cable or chain to such device in order to tow a vehicle, the design of such hooks does not permit effective towing without the risk that, due to possible slackness in the rope or cable during the towing operation, the hook might become detached from the rope or cable. Moreover, other prior art designs which utilize a hook with a spring retaining device, are often more expensive to produce due to their complexity of manufacture (e.g., requiring two or more pieces to be pivotally mounted together) and furthermore do not permit easy detachment of a cable or rope in all circumstances. Moreover, none of the prior art devices provides for a multi-dimensional retaining ability by which the strength of the tow device is not affected regardless of the force vectors applied to such device during a towing or lifting operation.

There is a long felt, but unsolved need for a simple lifting, towing and connecting device which can be manufactured in a one piece design, that permits multi-dimensional forces being applied to such device without the risk that a rope, cable or chain would be detached undesirably therefrom. The present invention thus alleviates the risk that an undesired detachment of a cable, chain or rope from such connecting device will occur in the event of a decrease in the tensioning of the rope, chain or cable during a lifting or towing operation.

SUMMARY OF THE INVENTION

The present invention is directed to one or more devices having a body and at least three separate prongs, with a first and second of such prongs being curved in substantially the same direction whereas the third prong is curved in an opposite direction intersecting the other two curved prongs. A chain, rope or cable can be interlaced so as to reside in the interior of the prongs and once interlaced, the rope, chain or cable will not be capable of exiting the interior of the body configured by the overlapping curved prongs without purposeful de-interlacing of such cable, rope or chain from the device. As such, the device finds particular application in situations where it is not desirable to have detachment of a chain, rope or cable when tension is released, for example, in a vehicle towing operation. The device of the present invention can be manufactured as a one piece unit and can be manufactured from any suitable material. In one embodiment, the material is sufficiently buoyant so that it can float on water, making the present invention suitable for use as a connector for use in water sports, such as water skiing. Various other embodiments of the present invention include additional prongs, such as a five or six membered prong devices wherein the prongs are spaced at particular desired angles emanating away from each other and having various angled curvatures with respect to opposing prongs, as well as with respect to adjacent prongs. Other configurations and uses for the present invention are set forth below and are described in the attached drawings.

DETAILED DESCRIPTION

Figure 1:
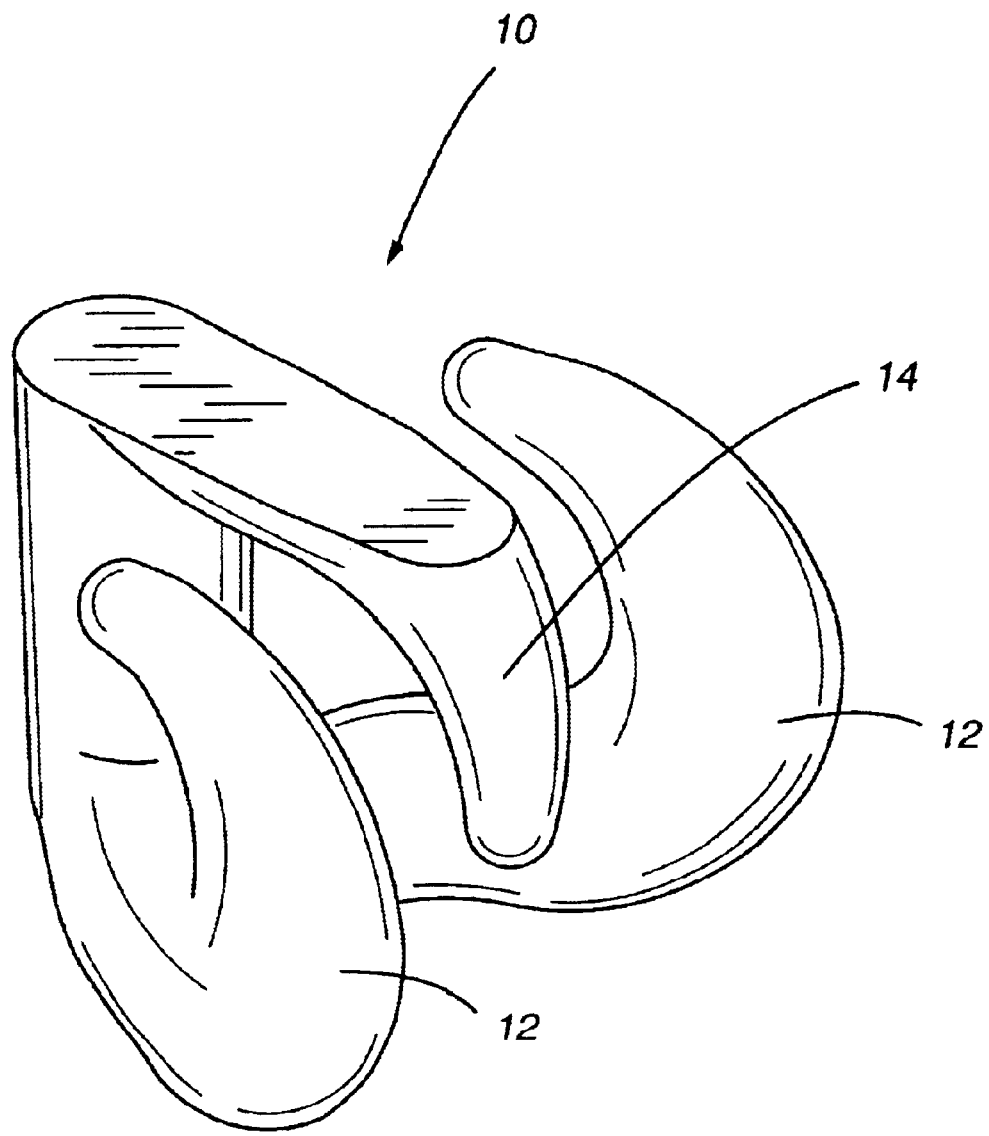
FIG. 1 is a side perspective view of a three prong embodiment of the present invention.
Figure 2:
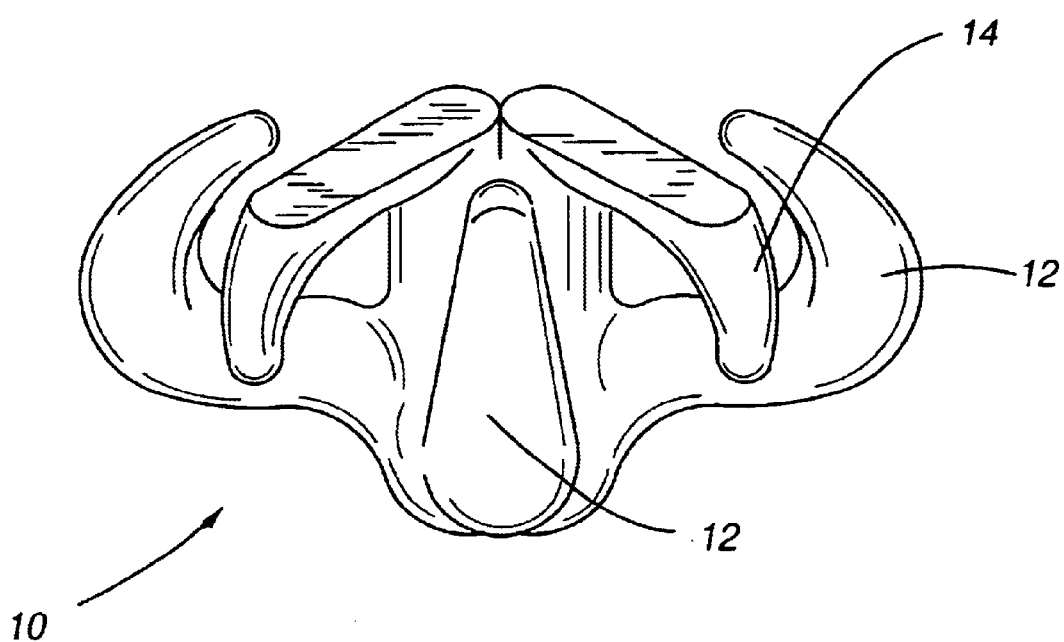
FIG. 2 is a side perspective view of a five prong embodiment of the present invention.
Figure 3:
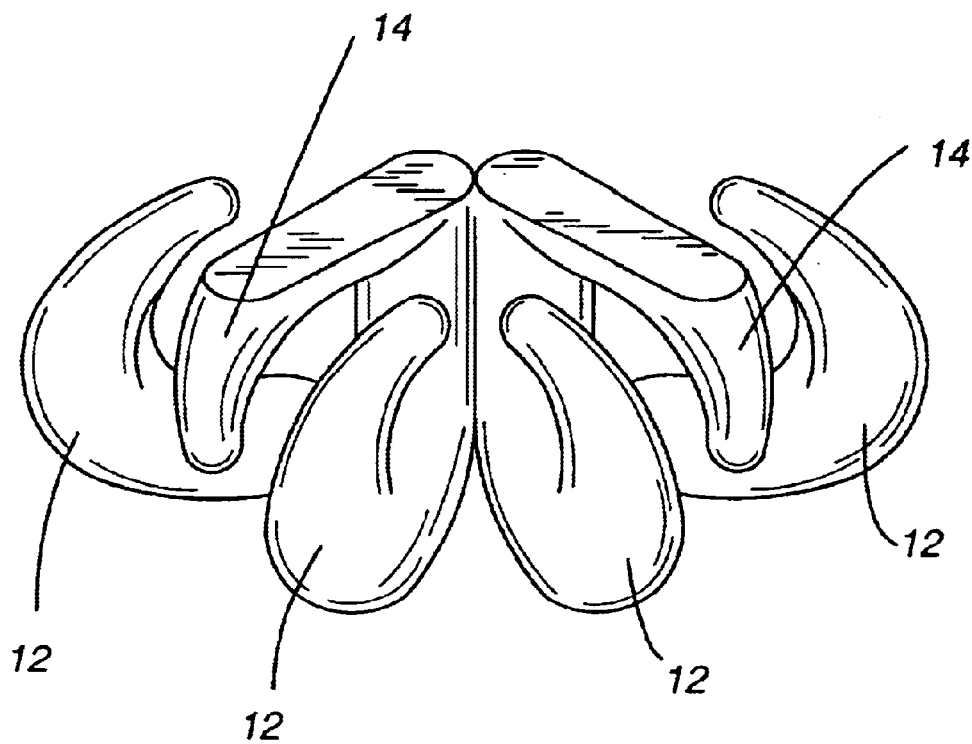
FIG. 3 is a side perspective view of a six prong embodiment of the present invention.

The present invention is directed generally to a lifting and towing device which solves the problems experienced in the prior art with respect to lifting and towing operations. The present device 10 can be easily manufactured in a one piece unit, and thus does not require that hinged or pivotal connections be made in order to insure that a rope, cable or chain attached thereto will not be disassociated therefrom during a lifting or towing operation, especially when the cable, chain or rope is slackened and not under constant tension. The basic design of the present invention 10 includes the use of at least three separate fingers 12, 14 which overlap with each other, preferably in a curved relationship. In a preferred embodiment, a three finger design is provided in which two fingers 12, 12 of the device curl in substantially the same parallel direction, whereas the third finger 14 curves in the opposite direction and intersects the curvature of the other two fingers 12, 12. Thus, the present invention in one embodiment can be viewed generally as a three prong device in which two prongs 12, 12 circle about a center prong 14 and form, in cross-section, a substantially circular or oval configuration. In a preferred embodiment, the three prongs 12, 14 have substantially the same curvature and length and, when viewed from the side of the device, more than a circle is formed by the overlapping prong/finger 12, 14 members. A rope, chain or cable (hereinafter generally referred to as a "cable" and to specifically include any type of tensioning elongated material which can be used in a towing or lifting operation) is interlaced about a center prong in a three prong configuration. An additional cable can be interlaced to surround the opposing curled finger/prongs 12, 12, thus permitting tensioning of both cables in opposite directions with the towing/lifting device of the present invention holding or connecting each opposing cable together.

It is within the scope of the present invention to have curved prong members having various sizes, shapes and configurations. In one embodiment, the curved fingers are of substantially the same length and have substantially the same curvature so as to form a "ram horns" curve, wherein a single prong intersects the vertex of the other two curved ram horns and is substantially centrally located therebetween. The degree of curvature of each finger/prong is variable, however, the ease of interlacing a cable member to the device suggests the desirability of having minimal stearic hindrance of the cable when interlacing with the respective prongs. Thus, as one will appreciate, the thickness of a cable to be interlaced with a particular prong of the present device will dictate not only the size of the overall device being utilized, but also the desired curvature of the prongs. In other words, the prongs should be spaced and curved respective to each other so as to allow a cable of desired girth to pass between such prongs so as to be arranged in a desired opposing towing/lifting orientation. In a preferred embodiment, a three quarter curled shape of the prongs is typically desired and functions well in most towing/lifting operations.

In other embodiments, the central prong intersecting the other two opposing curved prongs is shorter in its curved hook configuration. For example, the center prong can be a one-quarter curved hook configuration whereas the opposing exterior prongs have a three-quarter curl. Again, as viewed from the side perspective of the device, a preferred orientation dictates that at least a circle be formed with respect to the overlap of the center prong extension with the opposing curved exterior prongs. In such a manner, a cable once attached to the device cannot exit the device without encountering at least one of the three prongs. In view of such confinement, a cable can be pulled in essentially any direction around a 360° angle and will not be disengagable from the device when such device is under tension even when the cable is slackened. Indeed, it requires a purposeful disengaging interlacing of the cable from the prong members in order to detach a cable from the three prong configuration described herein.

In an alternative embodiment of the present invention, more than three prongs can be utilized. For example, and with reference to the figures as supplied herein, a four membered prong device can be used wherein opposing curved pairs of prongs are utilized in an overlapping relationship. In still further embodiments, a five prong device is provided wherein three curved prongs are generally curved in substantially the same direction with altering angles separating such prongs, meeting at a central vertex, typically culminating in a solid portion of the device. The opposing two prongs are curved in a manner to intersect the curved vertices of the two angled spaces created by the three opposing curved prongs. Even further embodiments can include more than the five prongs, however, the cost of manufacture and the necessity for additional prongs is not believed to be required in most towing and lifting operations. As one will appreciate, however, the thickness of each individual prong will obviously dictate the overall strength of the device and hence, while the thickness of a three prong embodiment with substantial girth being provided to each tapering prong may be viewed as necessary for a particular lifting or towing operation, an alternative five prong device having prongs with substantially smaller girths of each tapered prong can alternatively be used to accommodate the same type of load and tensioning stresses. The use of additional prong devices of the present invention may be advisable, for example, if there is some risk that one of the prongs under tension may break and/or bend under extreme tension.

The device of the present invention can be manufactured from any suitable material having the desired strength to withstand the tensioning and/or lifting/towing operation desired for particular uses. The device is preferably manufactured from a hardened metal and/or plastic material, preferably hardened steel and/or iron for most lifting towing operations. Other composite materials can be used, however, having lighter weight and desirable strength characteristics, such as devices manufactured from Kevlar, an hardened plastic, fiberglass, etc. Indeed, in various embodiments, such as a connector for a water ski tow rope, the device can be made out of material that is buoyant so as to float on water. Indeed, one of the advantages of the present invention is that the device can be manufactured from a material which does not sink in the event it is dropped into water.

In still other embodiments, the device of the present invention can be made from more than one material. For example, the prongs can be manufactured from a hardened steel material whereas the remaining body of the device can be manufactured from a hardened plastic material, thus providing a user with suitable physical characteristics of various materials in a lifting or towing operation. For example, even with the use of steel components in the present device, other components of the device can be made in a fashion to provide the overall device with a desired buoyancy in the event it is used in an open water situation.

The device of the present invention can be used in various context and situations. For example, one of the primary uses for the present invention can be used as a device to attach to opposing tensioned cables, such as may be used in towing a vehicle wherein one cable is attached to a moving vehicle whereas the other cable is attached to the vehicle requiring a tow. The device of the present invention can be attached to the opposing cables, for example, by using a three prong embodiment of the present invention, one cable is interlaced and encircles the single center prong, whereas the other cable encircles the exterior two prongs. In still other embodiments, the device of the present invention can be fixedly mounted so that only one cable is connected thereto for a lifting or towing operation. For example, the present invention can be fixedly connected to the rear of a vehicle in order to tow a vehicle therebehind. In such an embodiment, the device of the present invention is mounted so that the opposing curved prongs of the present invention are exposed in a manner that facilitates the interlacing of a cable about either the single center prong or the exterior two prongs. Obviously, the vehicle being towed can similarly have the device of the present invention fixedly mounted thereto, for example, at the forefront of the vehicle, thus facilitating interconnection of a single cable with two fixedly mounted devices of the present invention.

In another embodiment, the present invention is used as a lifting apparatus, for example, in the loading and unloading of cargo from ships, trucks and other possible containers. In such embodiment, a cable is attached to one or more prongs of the present invention, wherein another cable is suspended therefrom, such descending cable attached to the product to be lifted from or on a vessel, container or vehicle.

In still further embodiments, the present invention can be fixedly mounted to a dock or other static feature in order to act as a tie down for boats or other vehicles. Thus, it will be understood that the present invention can be used to supplant the use of typical t-shaped boat tie down structures which require the repeated encirclement of a cable or rope thereabout in order to attain securement of an attached vessel. When using the present invention, a loop can be fashioned at the end of a cable and such loop merely interlaced with the opposing curved prongs in order to achieve desired attachment and securement.

One potential advantage of the present invention relates to the fact that a suspended device being lifted is less prone to rotational movement than would otherwise be experienced if lifted by a conventional hook. This is due to the fact that, with respect to a three prong device of the present invention, two prongs are securing a cable in a spaced apart relationship, thus preventing the twisting of such cable about a single axis (e.g., the cable is suspended from two separate and spaced apart points which detracts from the rotational movement which would be encountered if suspended from a single attachment point).

While in a preferred embodiment, the prongs of the present invention are curved in a substantially circular or oval configuration, it is also within the scope of the present invention to have a device having prongs which are either straight or only partially curved. Using such device, the interlocking nature of the at least three fingers can accommodate the desired securement of a cable to such device without intended disengagement of the cable from such device.

The device itself can be securely fixed to another object, such as a dock, vehicle, etc. by welding the device into place, or otherwise securely attaching such device to another surface by using any suitable means.

Figure 4:
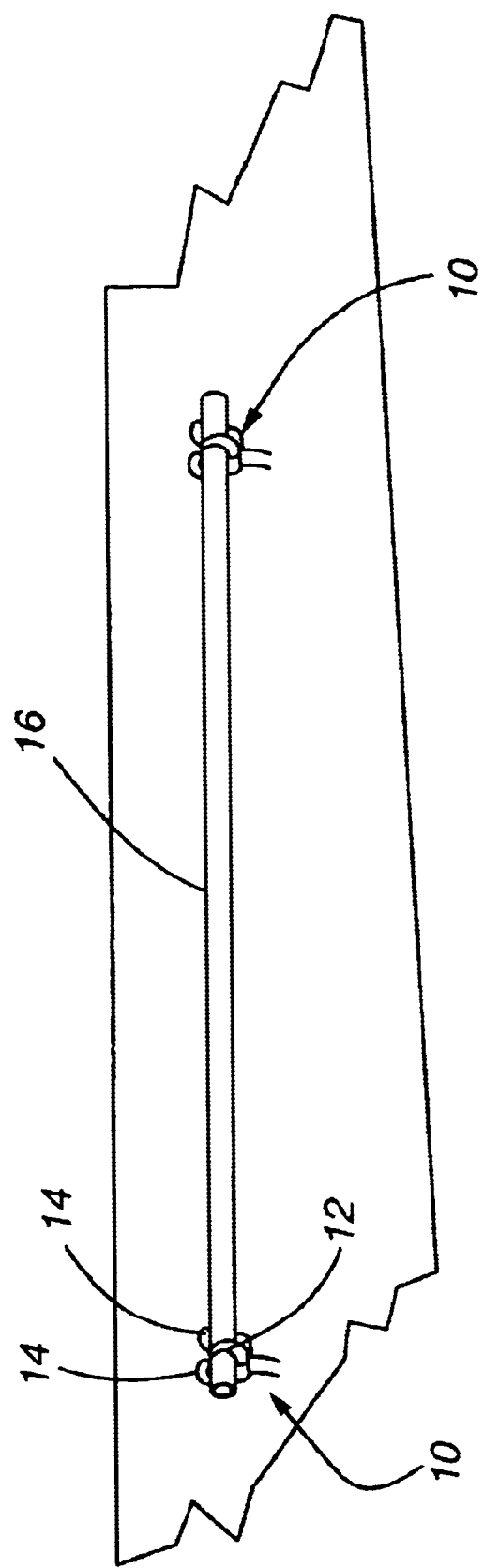
FIG. 4 is a perspective view of one potential application of the present invention in which a bar is transversely mounted through two spaced apart devices of the present invention.
Figure 5:
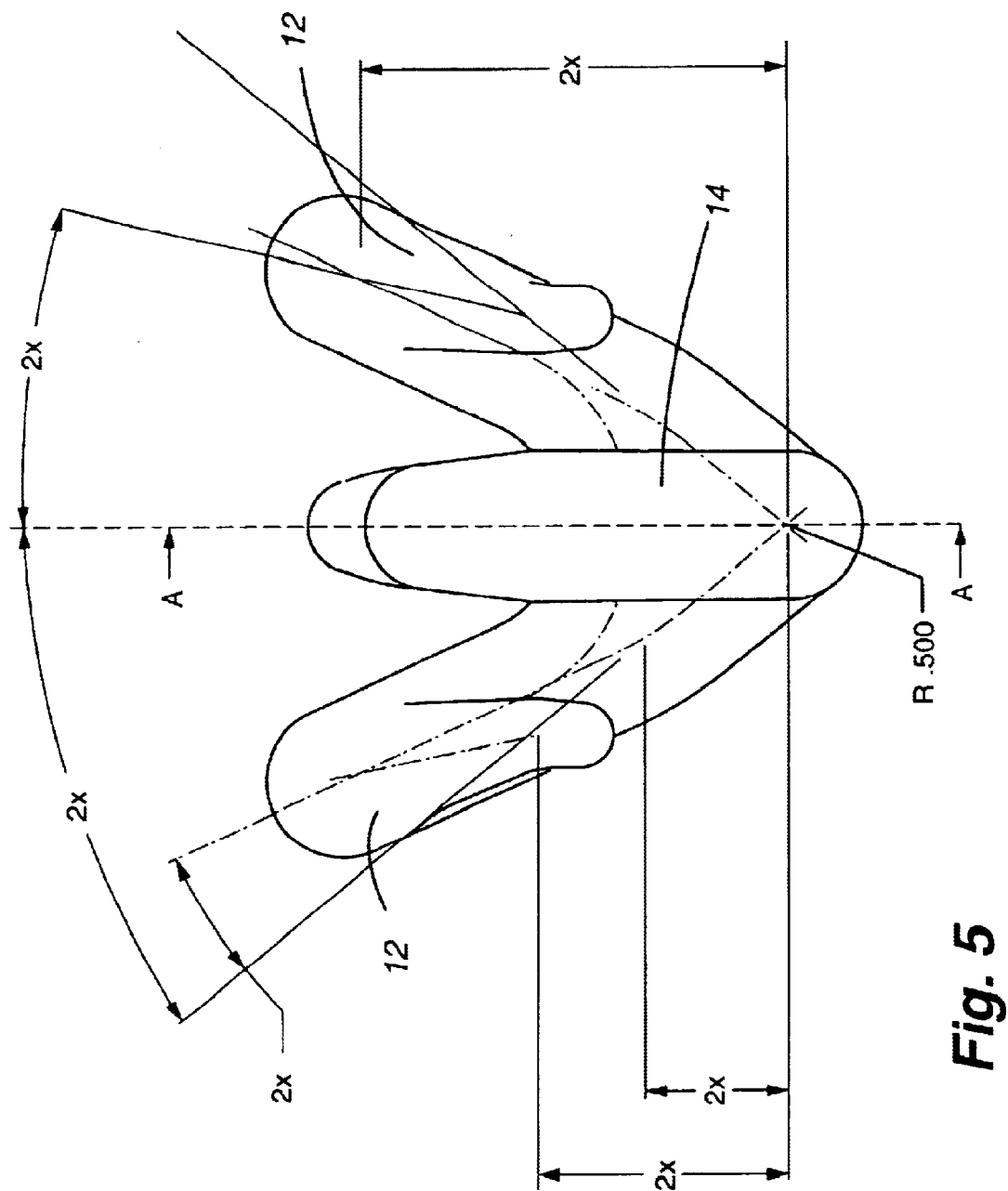
FIG. 5 is another perspective view of a three prong embodiment of the present invention indicating various angles of prongs relative to each other.
Figure 6:
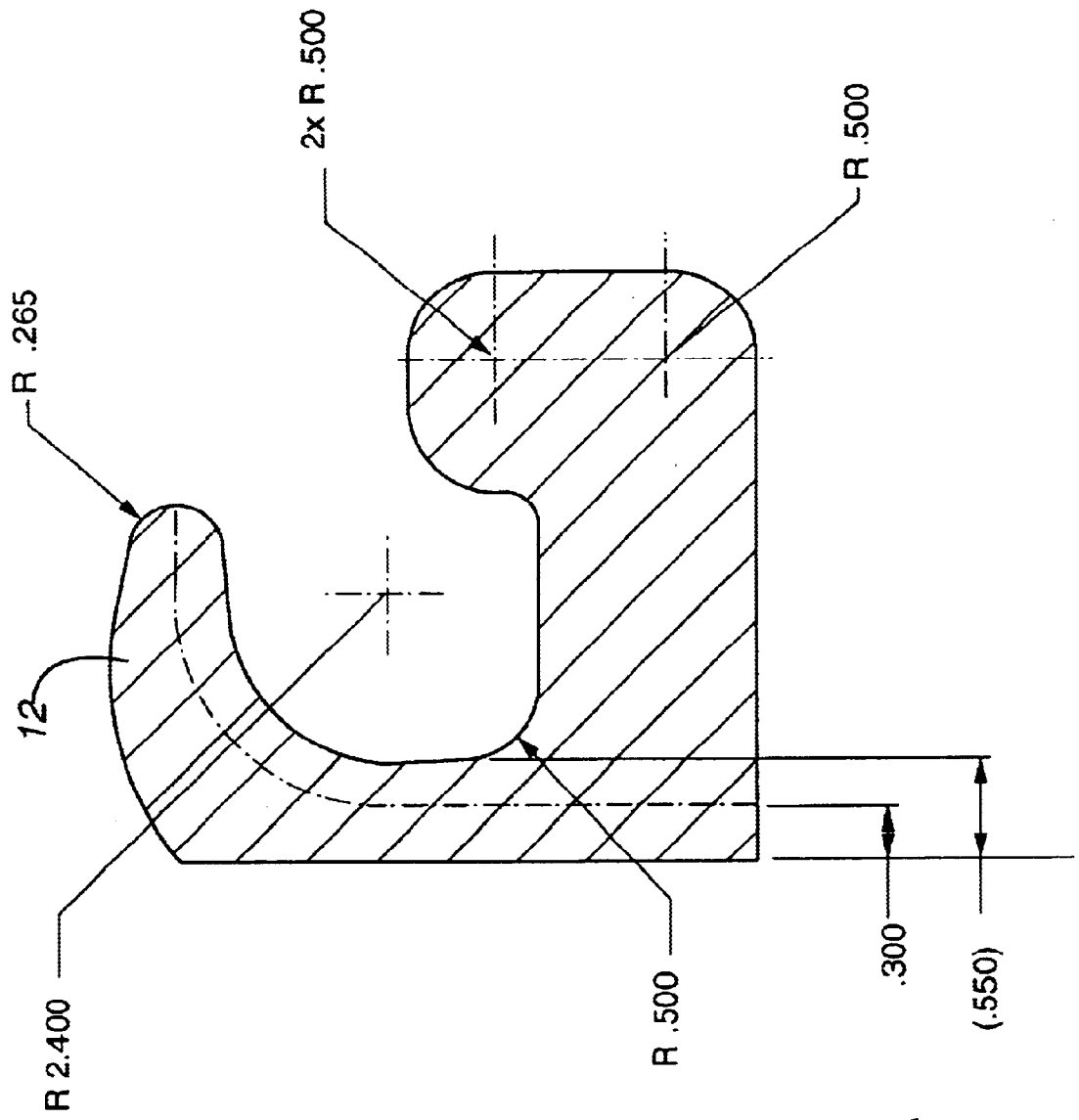
FIG. 6 is a side cutaway perspective of one prong of the device.
Figure 7:
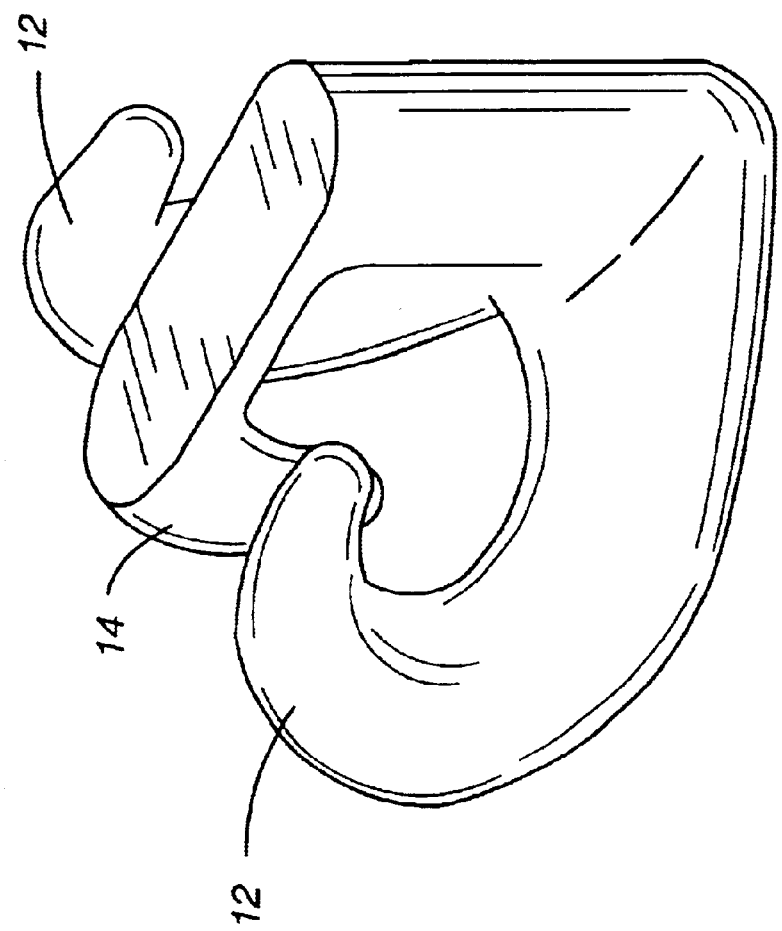
FIG. 7 is yet another perspective view of a three prong embodiment of the present invention.
Figure 8:
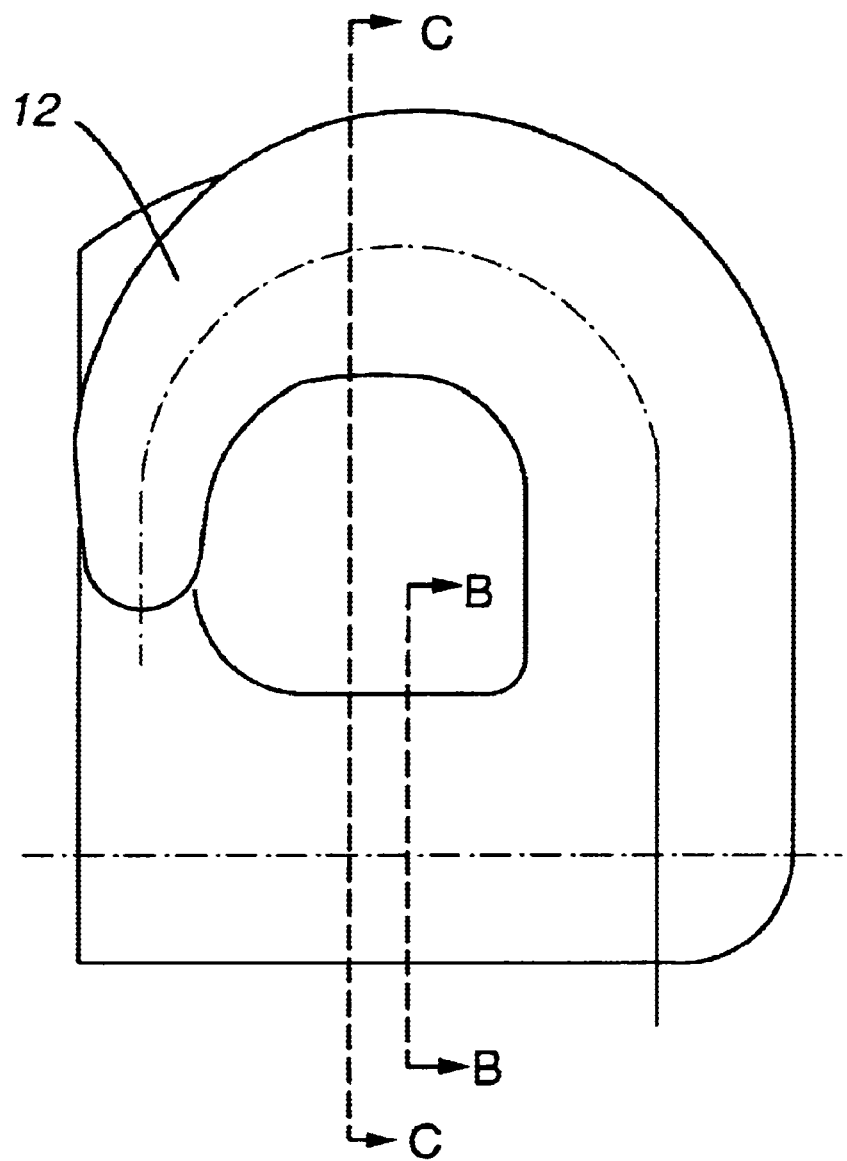
FIG. 8 is a side perspective view of the present invention indicating the opening existing through the center of the device.
Figure 9:
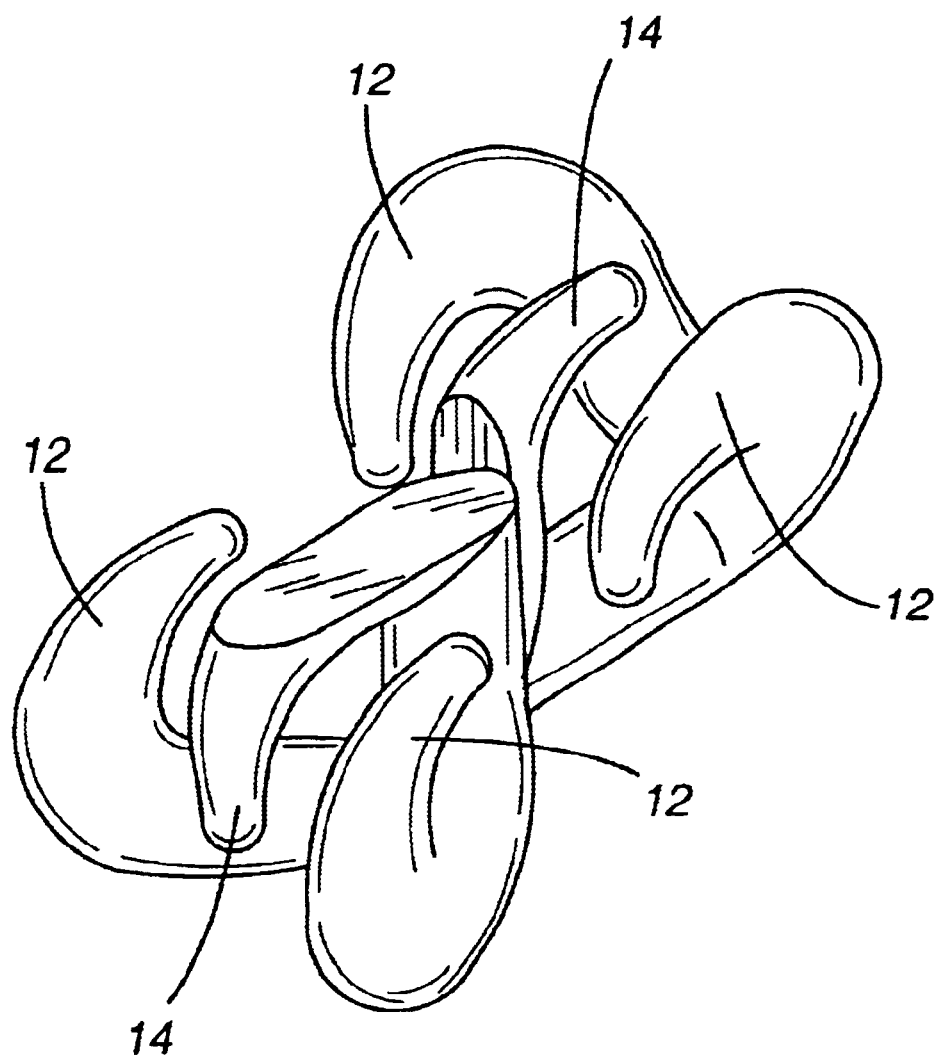
FIG. 9 is a alternative embodiment of the present invention having three prong hook embodiments fastened back to back.
Figure 10:
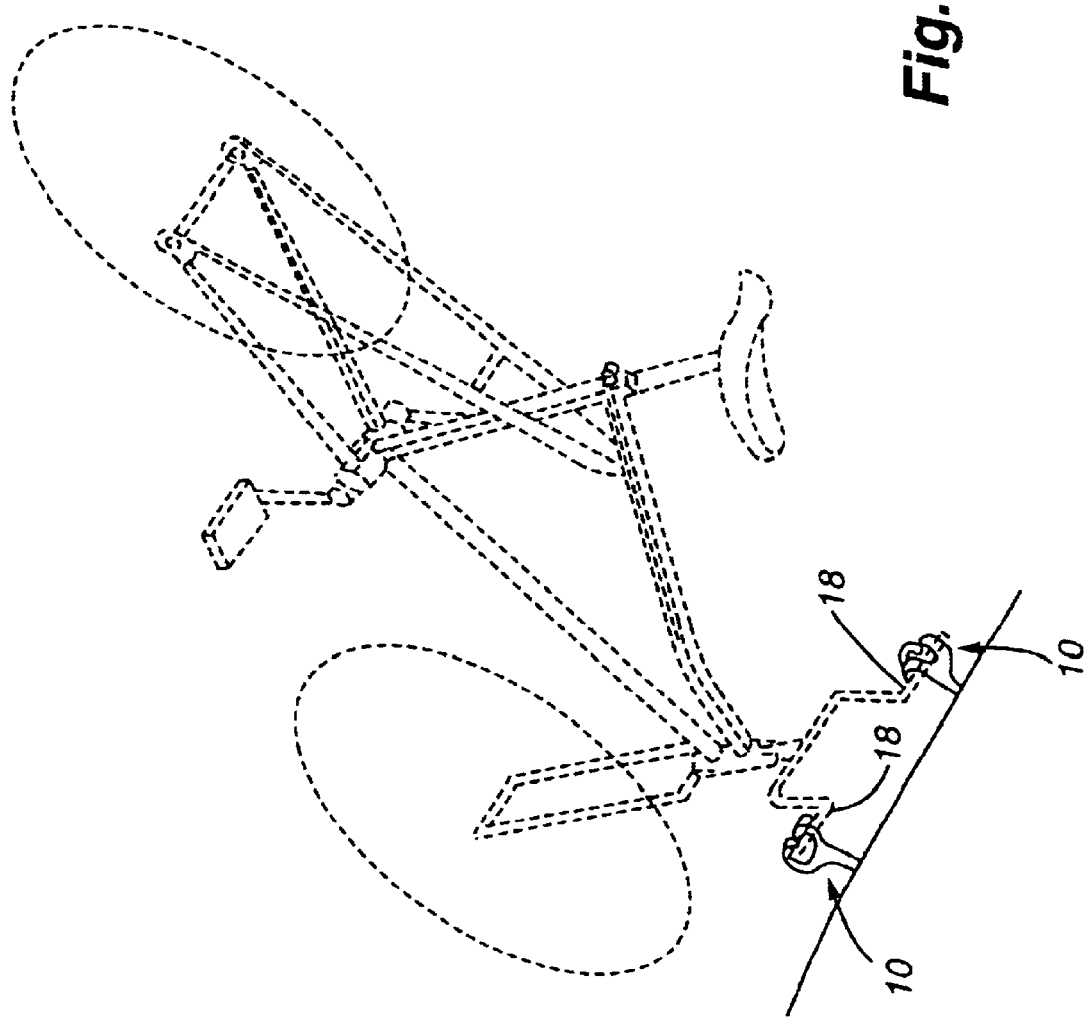
FIG. 10 illustrates the use of two mounted versions of a three prong embodiment of the present invention to secure bicycle handles to a surface.

In one embodiment of the present invention, two or more of such devices 10 can be secured to another object in order to retain a bar or pipe 16 that can be transversely inserted through the circular side opening of such devices 10. This embodiment is illustrated, for example, in FIG. 4. The bar or pipe 16 thus inserted through one or more of such devices 16 can then be utilized as a securement object and the disassembly of the securement device is therefore simply accomplished by removing the bar or pipe 16 from the fixedly attached securement device 10 of the present invention when not in use. For example, this embodiment may find application in a vehicle or boat rack where it may be advisable to detach a transverse bar from the securement towing/lifting devices when not in use, thus preventing theft of the bar/pipe 16. Due to the preferably loose attachment of the bar or pipe 16 through the center opening of the mounted devices 10 of the present invention, the pipe or bar 16 is capable of being rotated within such devices 10, without being detached therefrom. Thus, it is possible to apply tension in a perpendicular direction to the transverse orientation of the bar 16, with the bar 16 being secured in place by the attachment/connector means of the present invention. Indeed, in one embodiment (see FIG. 10), the handlebars 18 of a bicycle can be threaded through two adjacent devices in order to maintain the bicycle handlebars 18 in a fixed orientation for conveyance.

As will be appreciated by those of skill in the art, the above-described uses of the present invention are but a few of the vast multitude of potential uses. The particular curvature of prongs used, the number of prongs used, the thickness of such prongs, and the number of such separate devices used in any particular application will occur to those dependent upon the particular use desired.

The present invention, as set forth above, generally relates to at least three separate prongs, with two prongs bent or curved in one general direction and a third prong intersecting the other two prongs in the opposite curved direction. The advantage of the present invention over a simple circular eyelet is that a preformed loop of cable cannot be secured to such an eyelet, while such a preformed loop can be interlaced between the prongs of the present invention to afford engagement therewith. The particular distance between each individual prong from its adjacent prong is variable and the angles by which such prongs are separated can be varied to accommodate particular uses and applications of the present invention. The angles are preferably between about 10° and 75°, more preferably between about 15 and 45°, and most preferably, around 33°. The parametric angles of such prongs, in other embodiments, can for example, vary between 10° and 40° in a preferred embodiment depending upon the various uses thereof. The angles of the prongs from the center of curvature are parametric. Such angles are dependent upon the size of the hook configuration utilized in combination with the size of chain, rope, or other attachment article. Preferably, the angles of the prong and/or hooks only allow for the insertion of a chain, rope, etc. that will not exceed the rated capacity of the hook and its mount. As such, as one will appreciate, the angles possible for use in the present invention increase proportionately with the size of the hook/prongs utilized. Preferably, such angles vary from between about 10% to about 75%. In order to arrive at acceptable angles between prongs, one should preferably take into consideration a manufacturers' rated capacity for the particular rope, cable, chain, strap or attachment to the hook that may be utilized. Then, the diameter of the prongs or fingers can be calculated in order to provide sufficient strength so as not to exceed the load capacity as determined by the manufacturers' rated capacity for the rope, cable, chain, etc. Using the diameter of the prongs or fingers, the angle at which the prongs or fingers are fixed can be determined by adjusting the angle between the prongs to allow for a minimum insertion of a rope, cable, chain or strap. In such a manner, the "ram hook" device of the present invention will be preferably the strongest component in the pulling or securing operation.

Figure 11:
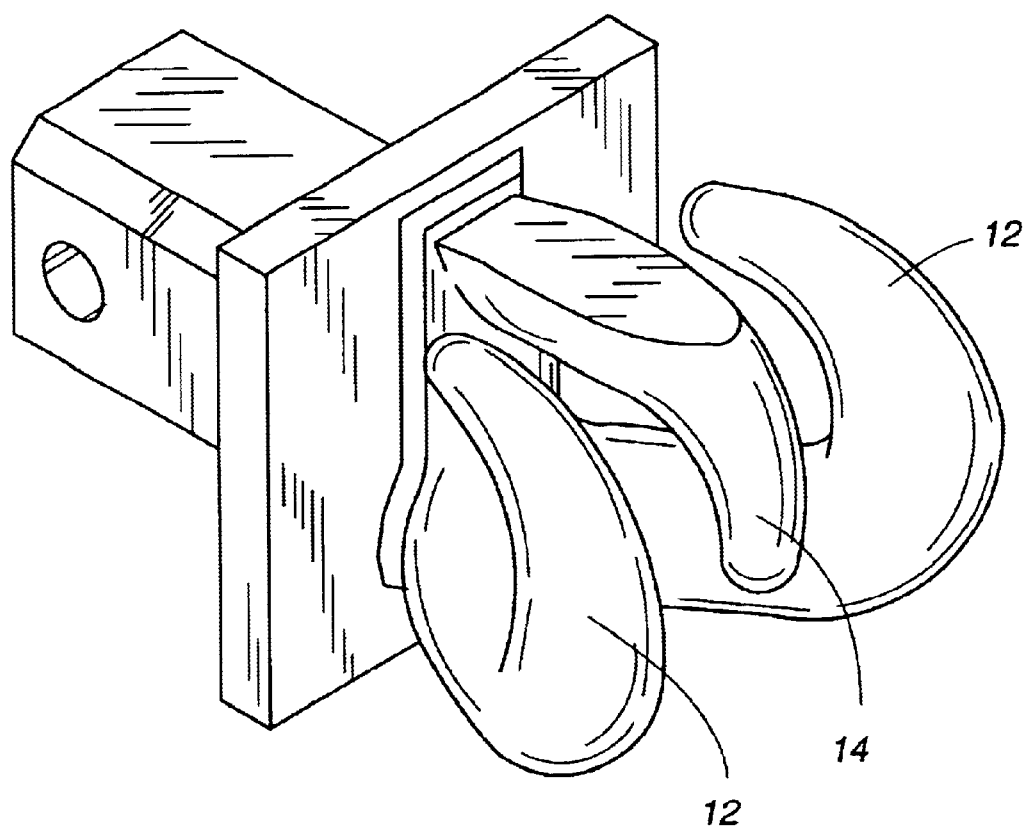
FIG. 11 is an illustration of one embodiment of the invention suitable for connection to a trailer hitch mount.
Figure 12:
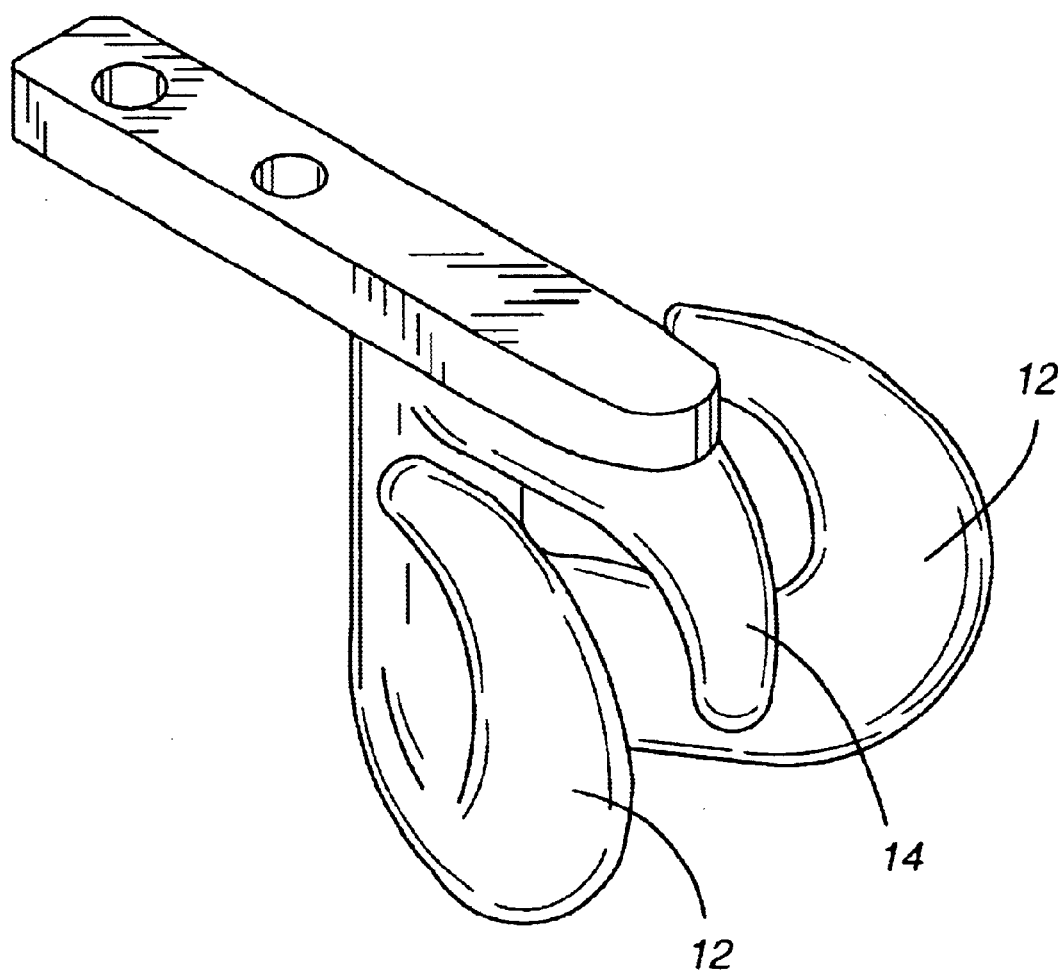
FIG. 12 is an illustration of one embodiment of the invention suitable for attachment in a descending manner.
Figure 13:
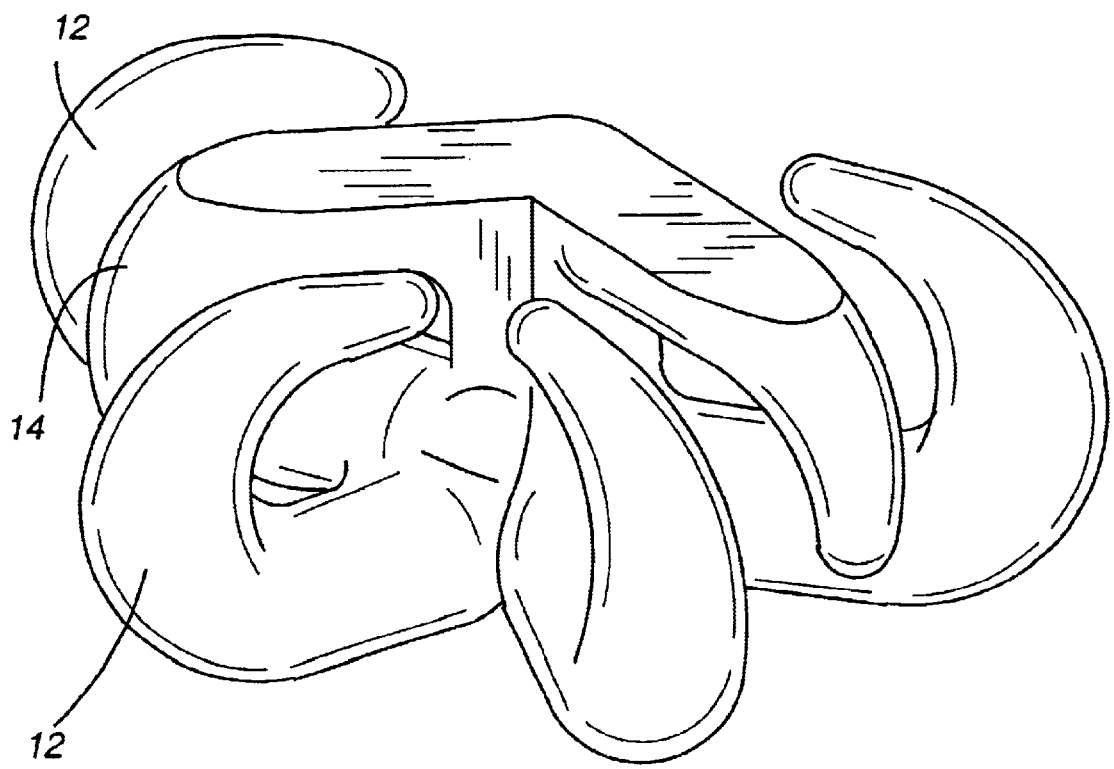
FIG. 13 shows one embodiment of the present invention with four ascending and two descending hook fingers.
Figure 14:
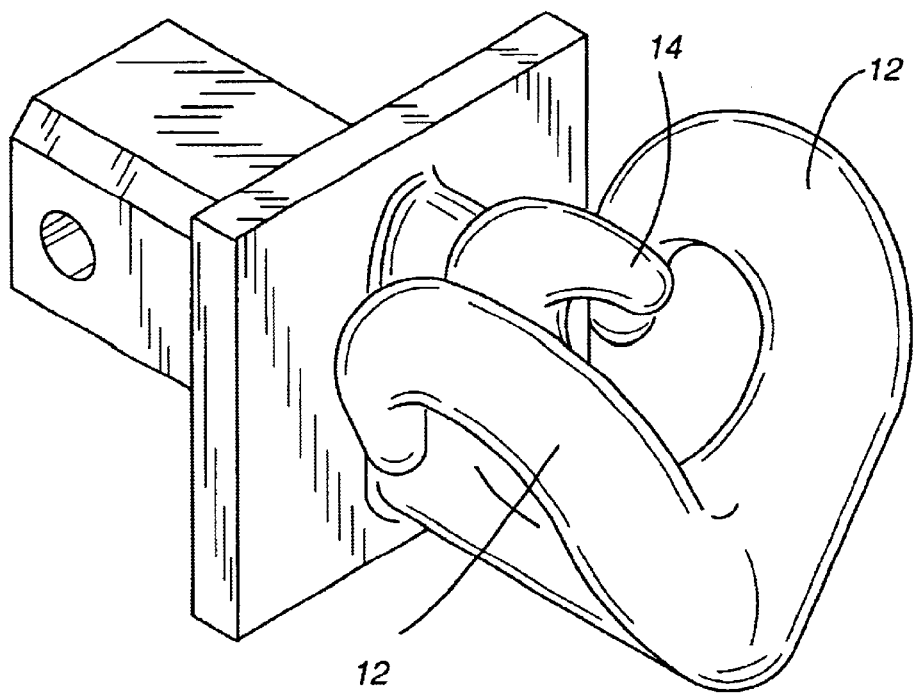
FIG. 14 shows one embodiment of the present invention suitable for mounting to a trailer hitch having fingers with curvatures more enhanced than those as shown in FIG. 11.
Figure 15:
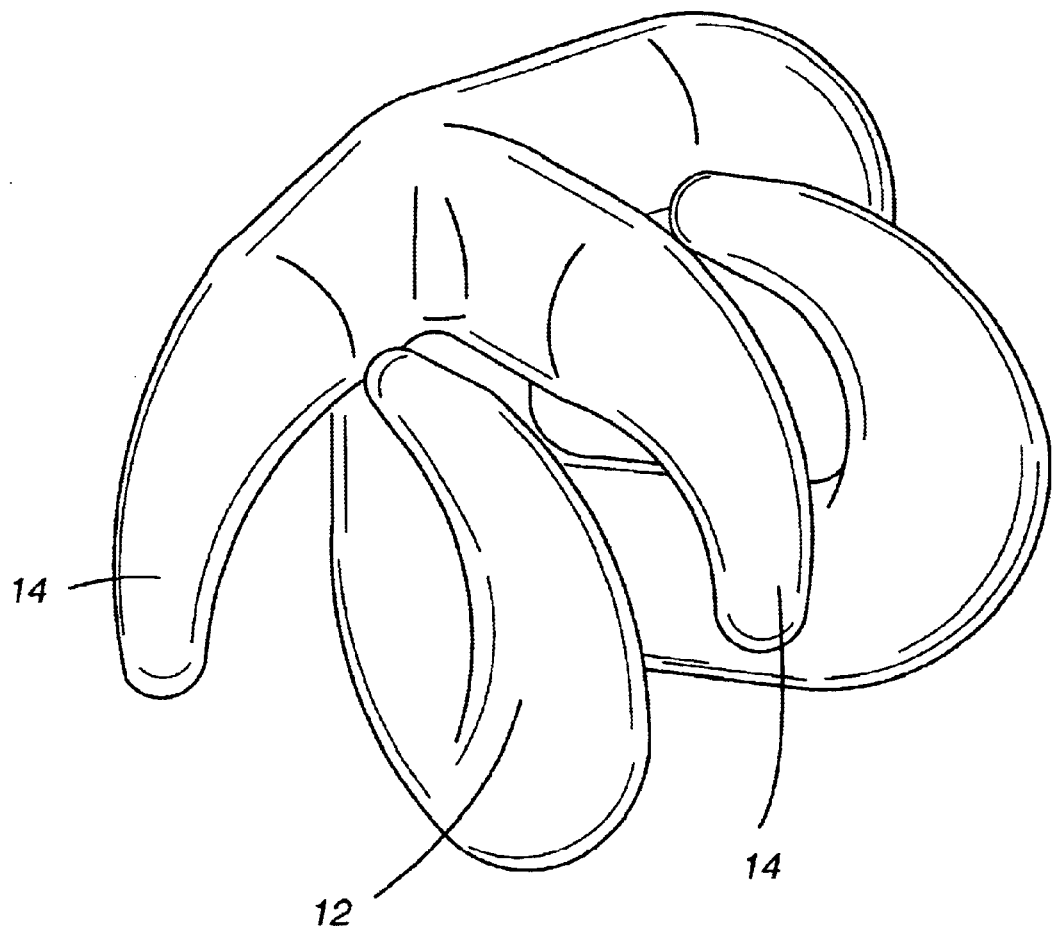
FIG. 15 shows another embodiment of the present invention with five hooked fingers, three descending and two ascending having various curvatures thereto.
Figure 16:
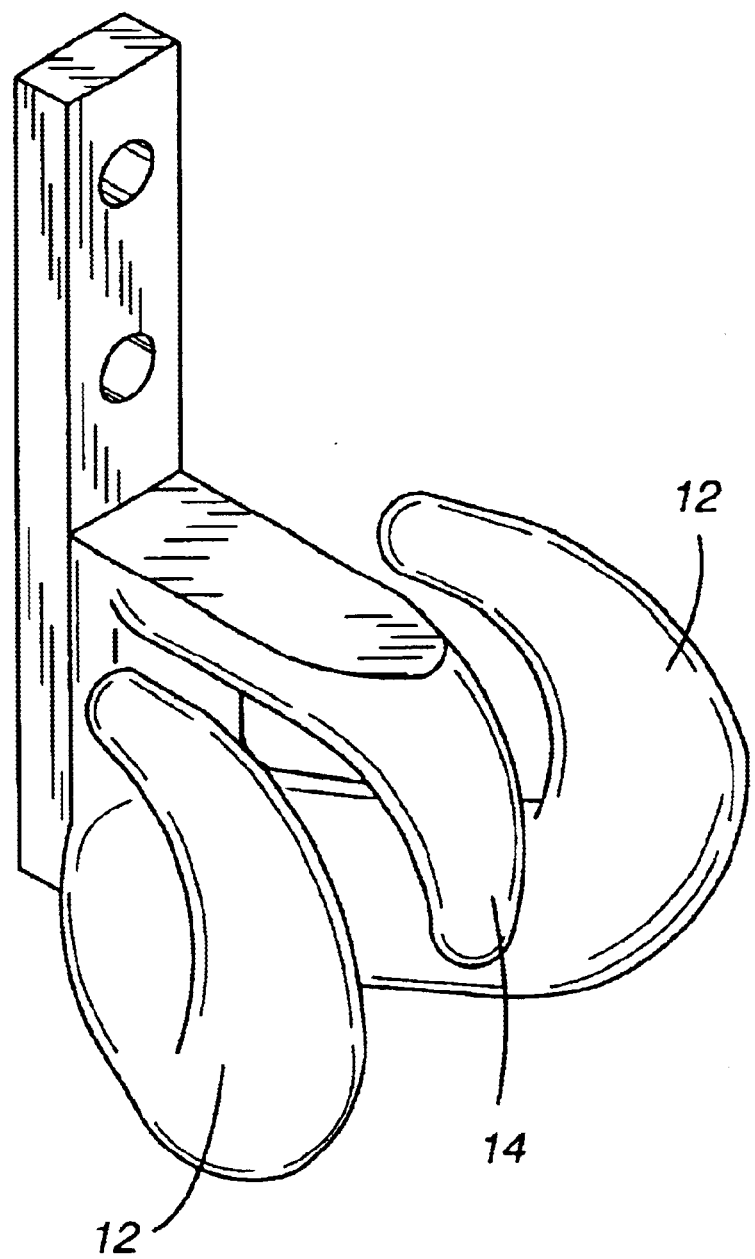
FIG. 16 is another embodiment of the present invention suitable for attachment in a vertical plane.
Figure 17:
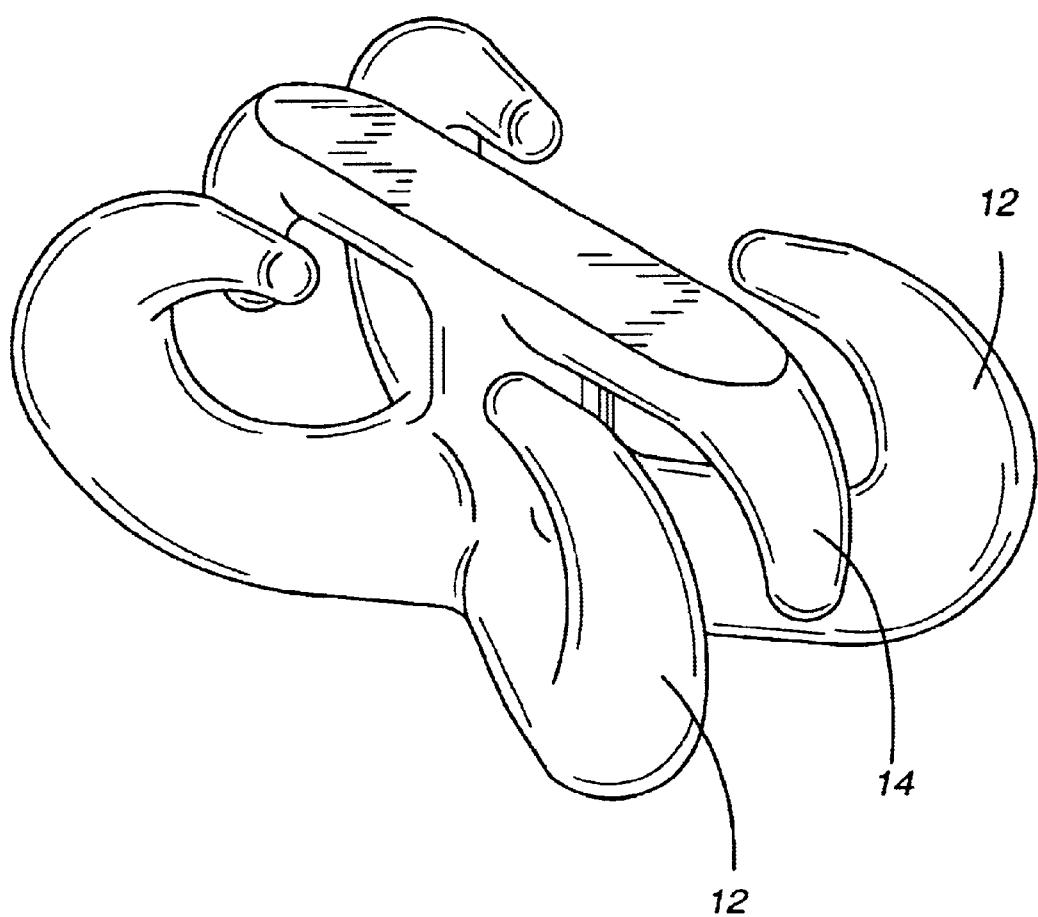
FIG. 17 illustrates one embodiment of the invention having two three-hooked embodiments connected together to form one unit for attachment of articles, ropes, chains, in opposite directions.

As will be appreciated by those of skill in the art, the present invention can be manufactured with various attachment means so as to affix it to vehicles, docks, boats, etc. Indeed, with reference to FIGS. 11 and 14, the present invention can be manufactured so as to easily attach to existing trailer hitch devices. Alternatively, various horizontal (FIG. 12) and/or vertical (FIG. 16) attachment means often including at least one, and preferably, at least two bolt holes can be provided in a device to afford proper attachment to desired articles.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A system useful in lifting or towing operations, including first and second apparatuses, each apparatus comprising:
   a body having at least three separate prongs emanating therefrom in a fixed position, two of said prongs being in a curved configuration and a third of said prongs being curved in an opposite and intersecting configuration between said first and second prongs, said body having an interior defined by the overlapping of said prongs, whereby a cable can be interlaced between said opposed curved prongs to retain said cable within the interior of said body when said cable is pulled in substantially any direction around a 360 degree angle;
   said second apparatus spaced apart from said apparatus and having a bar extending through said interiors of said apparatuses.
2. The apparatus as set forth in claim 1, wherein said bar comprises a handlebar for a bicycle.

* * * * *